J. Taylor,
Harvester Rake.
No. 35,270. Patented May 13, 1862.
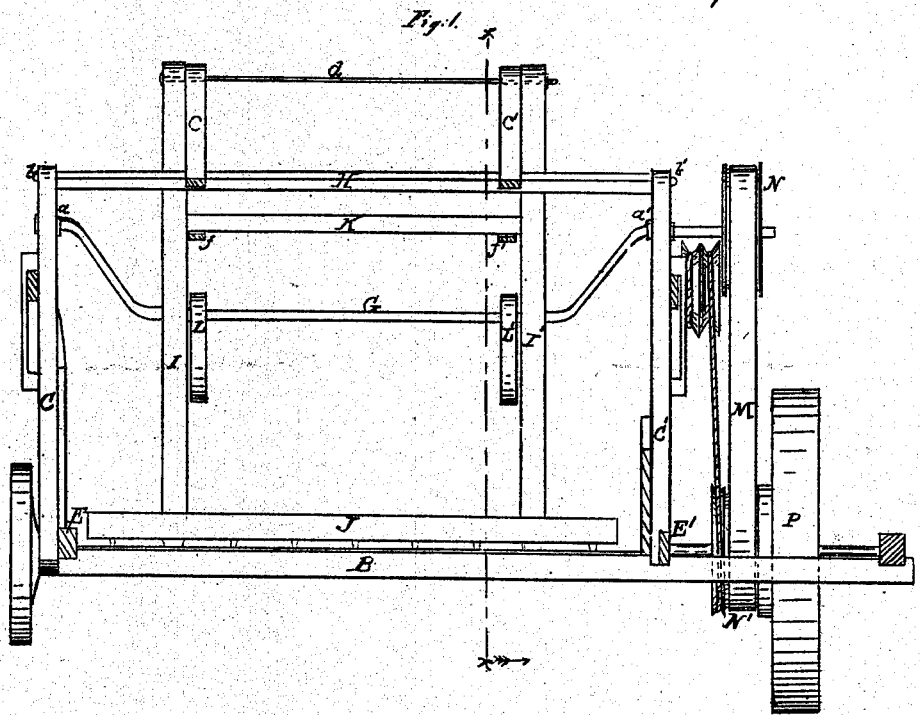
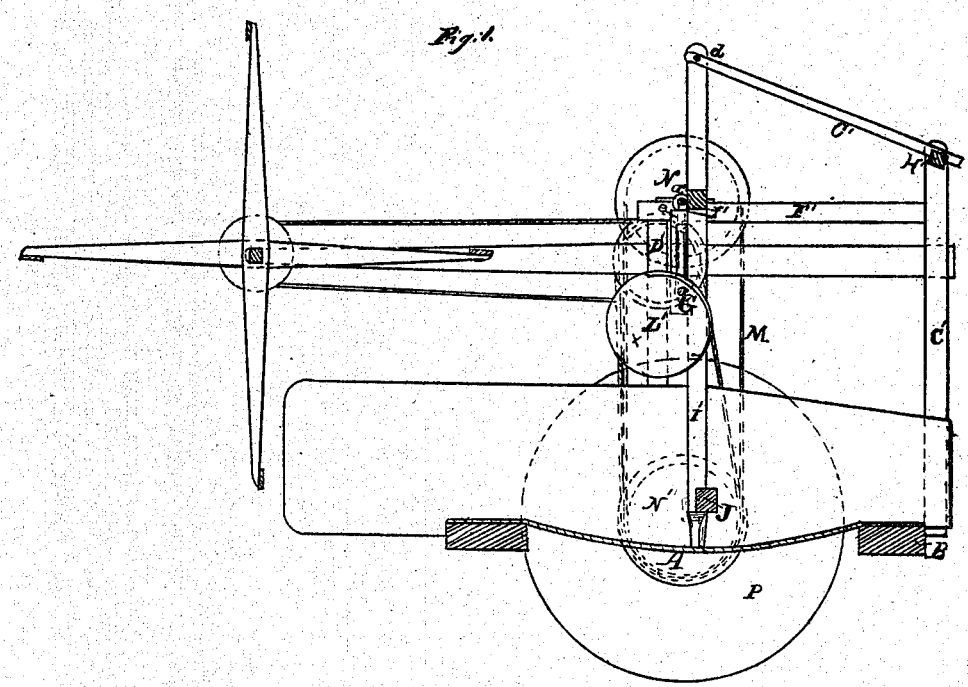

UNITED STATES PATENT OFFICE.

JOHN TAYLOR, OF MAGNOLIA, ILLINOIS.

IMPROVEMENT IN RAKES FOR HARVESTERS.

Specification forming part of Letters Patent No. 35,270, dated May 13, 1862.

*To all whom it may concern:*

Be it known that I, JOHN TAYLOR, of Magnolia, in the county of Putnam and State of Illinois, have invented certain new and useful Improvements in the Raking Attachments of Harvesters or Grain-Cutting Machines; and I do hereby declare that the following is a description thereof in terms which now seem to me to be sufficiently full, clear, and exact, reference being had to the annexed drawings, making a part of this specification, in which—

Figure 1 is a rear elevation; and Fig. 2, a vertical section in the line $x\ x$ of Fig. 1, looking toward the right, as indicated by the arrow.

The nature of my invention consists in increasing the radius of the circle described by the operating-crank as it passes forward over the grain, so as to pass entirely clear of it without at the same time throwing the rake too far forward or too far in the rear.

To enable others skilled in the art to make and use my invention, I will proceed to describe its construction and operation.

I use a concave platform, as represented at A, from the rear sill, B, of which rise the standards C C'. Two other standards, D D', only one of which is seen in the drawings, are erected from the two cross-ties, E E', of the platform from near the center of their lengths. The standards serve to support the cross-bars F F', the latter of which is alone shown, and these again support the boxes $a\ a'$ of the crank-shaft G. The standards C C' rise above the cross-bars F F', and are provided with boxes $b\ b'$ for the rock-shaft H, to which are bolted the two arms $c\ c'$, which reach forward and are jointed to the upper ends of the two arms I I' of the rake-head J by means of the rod $d$. These two arms I I' are slotted transversely to the line of draft of the machine; or they may be provided with slotted or mortised boxes, one of which is seen at $e$, Fig. 2, through which passes the crank-pin of the crank G. A cross-bar, K, connects the two arms I I', to the under side of which are attached the blocks $f\ f'$, against which bear intermittently the cams L L' on the crank-pin of the crank-shaft G.

The operation of this rake attachment is as follows: Motion being communicated to the crank-shaft by means of the belt M, passing round the pulleys N on the crank-shaft and N' on the main driving-wheel P, the rake is set in motion; and supposing it to have arrived at the point shown in the drawings, where it is represented as in the act of raking a gavel from the platform, it will be seen that the cams L L' are not in contact with their bearing-blocks $f\ f'$, and that the crank-pin is in the lower end of the slots in the arms I I' of the rake-frame. As, therefore, the rake progresses rearwardly, it is at liberty to follow the curve of the platform, which it does by virtue of its own gravity until it has entirely removed the gavel, at which moment the cams are brought into contact with the bearing-blocks, when the rake is gradually elevated thereby until it passes forward entirely clear of the grain on the platform. At this point the cams begin to fall, the rake falling with them until it rests upon the grain, when it again commences its rearward motion, sliding upon the surface of the platform and carrying with it the succeeding gavel.

The advantages of my invention are that by the use of the cams I vary the range of motion of the rake communicated by the crank alone in such a manner that the radius of the circle described thereby is increased as the rake passes forward over the grain on the platform, and therefore passes entirely clear of it. It is true that the crank alone might be so increased in its radius as to do this; but then the circle described would be such that the rake would reach too far forward or too far in the rear.

I do not in all cases confine myself to the use of a curved platform, for it is obvious that the crank, cams, and slotted rake-arms are applicable also to a plane platform.

Having thus described my invention and pointed out the manner in which it operates, what I claim therein as new, and desire to secure by Letters Patent of the United States, is—

1. The rake-frame provided with slotted arms I I' and the cross-bar K, in combination with the crank-shaft G and cams L L', as and for the purposes set forth.

2. The rake J, provided with slotted arms I I' and the cross-bar K, and hinged to the arms $c\ c'$, which are attached to the rock-shaft H, in combination with the crank G and cams L L', when these several parts are arranged for operation in connection with each other and with the concave platform A, in the manner and for the purpose specified.

JOHN TAYLOR.

Witnesses:
N. H. SETTS,
S. J. TAYLOR.